US009766336B2

(12) United States Patent
Gupta et al.

(10) Patent No.: US 9,766,336 B2
(45) Date of Patent: Sep. 19, 2017

(54) VEHICLE OBSTRUCTION DETECTION

(71) Applicant: HERE GLOBAL B.V., Veldhoven (NL)

(72) Inventors: Vishisht Vijay Gupta, El Cerrito, CA (US); Michael Prados, Oakland, CA (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 14/658,802

(22) Filed: Mar. 16, 2015

(65) Prior Publication Data

US 2016/0274239 A1    Sep. 22, 2016

(51) Int. Cl.
*B60R 22/00* (2006.01)
*E05F 15/00* (2015.01)
(Continued)

(52) U.S. Cl.
CPC .............. *G01S 17/936* (2013.01); *G01C 3/08* (2013.01); *G01C 21/3415* (2013.01);
(Continued)

(58) Field of Classification Search
CPC .. G01S 2013/9371; G01S 17/93; G01S 17/89; G01S 17/42; G01S 17/08; G01S 19/13; G01S 17/66; G01S 19/45; G01S 17/48; B60G 17/019; B60G 17/01933; B60G 17/0272; B60G 2500/30; B60G 2200/142; B60K 2001/0438; B60K 2001/005; B60K 2350/1076; B60K 2001/008; B62D 25/2081; B62D 55/065; B62D 55/075; B62D 57/024; B62D 63/061; B62D 53/08; B62D 25/2027; B62D 57/032

USPC ...... 701/301, 1, 2, 70, 26, 28, 300, 400, 41, 701/461, 50, 468, 37, 22, 408; 280/124.164, 402, 511, 650, 8, 830
See application file for complete search history.

(56) References Cited

U.S. PATENT DOCUMENTS 3,603,330 A * 9/1971 Halldorson ............... B60P 3/38
                                                    135/116
5,787,369 A * 7/1998 Knaak ................... B61L 23/041
                                                    340/435
(Continued)

OTHER PUBLICATIONS

Liu, Bridge Clearance Evaluation Based on Terrestrial LIDAR, pp. 1-2.
(Continued)

*Primary Examiner* — Jelani Smith
*Assistant Examiner* — Luis A Martinez Borrero
(74) *Attorney, Agent, or Firm* — Lempia Summerfield Katz LLC

(57) ABSTRACT

Obstructions in a path of a vehicle may be determined by recording a plurality of measurements while the vehicle is traveling through a geographic area. The plurality of measurements may involve a velocity of the vehicle, positions relative to the vehicle of a plurality of objects in the geographic area. Also, a path of a vehicle may be determined. An obstruction in the path may be detected as an object of the plurality of objects that is in the path. Also, the obstruction may be determined to be a stationary obstruction as a function of the velocity of the vehicle and multiple positions of the obstruction relative to the vehicle measured over time.

19 Claims, 7 Drawing Sheets

(51) Int. Cl.
| | |
|---|---|
| *G05D 1/00* | (2006.01) |
| *G06F 7/00* | (2006.01) |
| *G06F 17/00* | (2006.01) |
| *G01S 17/93* | (2006.01) |
| *G01S 17/02* | (2006.01) |
| *G01S 17/06* | (2006.01) |
| *G01S 17/89* | (2006.01) |
| *G01S 7/481* | (2006.01) |
| *G01S 7/497* | (2006.01) |
| *G01C 3/08* | (2006.01) |
| *G01C 21/34* | (2006.01) |

(52) U.S. Cl.
CPC ............ *G01S 7/4813* (2013.01); *G01S 7/497* (2013.01); *G01S 17/023* (2013.01); *G01S 17/06* (2013.01); *G01S 17/89* (2013.01)

(56) References Cited

U.S. PATENT DOCUMENTS

| | | | | |
|---|---|---|---|---|
| 5,978,736 | A * | 11/1999 | Greendale | G01S 17/06 340/904 |
| 6,853,738 | B1 * | 2/2005 | Nishigaki | G01C 3/085 348/139 |
| 6,992,613 | B2 * | 1/2006 | Yoneda | G01S 13/878 342/118 |
| 7,038,577 | B2 * | 5/2006 | Pawlicki | G06T 7/13 340/435 |
| 7,295,154 | B2 * | 11/2007 | Walton | G01S 7/352 342/126 |
| 7,587,081 | B2 * | 9/2009 | Rovira-Mas | G06T 7/70 345/419 |
| 8,199,046 | B2 * | 6/2012 | Nanami | G01S 13/931 340/425.5 |
| 8,423,280 | B2 * | 4/2013 | Edwards | G01S 7/062 340/435 |
| 8,818,703 | B2 * | 8/2014 | Harada | B60R 21/0134 342/173 |
| 9,243,440 | B1 * | 1/2016 | Higgins | E05F 15/73 |
| 2002/0191837 | A1 * | 12/2002 | Takeda | G01C 11/06 382/154 |
| 2003/0028291 | A1 * | 2/2003 | Matsuura | G01S 7/4802 701/1 |
| 2003/0204298 | A1 | 10/2003 | Ahmed-Zaid et al. | |
| 2005/0004762 | A1 * | 1/2005 | Takahama | G01S 17/936 701/301 |
| 2005/0021192 | A1 * | 1/2005 | Takafuji | B60R 21/0136 701/1 |
| 2005/0073433 | A1 * | 4/2005 | Gunderson | B60Q 9/006 340/903 |
| 2005/0270225 | A1 * | 12/2005 | Tokoro | G01S 7/4004 342/70 |
| 2006/0013439 | A1 * | 1/2006 | Takeda | G01C 11/06 382/103 |
| 2006/0106538 | A1 | 5/2006 | Browne et al. | |
| 2006/0293856 | A1 * | 12/2006 | Foessel | B60W 30/09 701/301 |
| 2007/0071311 | A1 * | 3/2007 | Rovira-Mas | G06T 7/70 382/154 |
| 2007/0103282 | A1 | 5/2007 | Caird et al. | |
| 2008/0097700 | A1 | 4/2008 | Grimm | |
| 2008/0281522 | A1 * | 11/2008 | Subelet | G08G 5/0078 701/301 |
| 2008/0319670 | A1 * | 12/2008 | Yopp | B60W 30/16 701/301 |
| 2009/0002222 | A1 * | 1/2009 | Colburn | G01C 9/00 342/145 |
| 2009/0062985 | A1 * | 3/2009 | Ohashi | B60G 17/04 701/37 |
| 2010/0030474 | A1 | 2/2010 | Sawada | |
| 2010/0100325 | A1 * | 4/2010 | Lovell | G08G 1/0104 701/301 |
| 2011/0181407 | A1 * | 7/2011 | Kole | G01C 5/00 340/435 |
| 2011/0221628 | A1 * | 9/2011 | Kamo | G01S 7/295 342/70 |
| 2011/0255747 | A1 * | 10/2011 | Iwasaki | G06K 9/00348 382/103 |
| 2012/0303258 | A1 * | 11/2012 | Pampus | B60W 30/0956 701/301 |
| 2013/0027559 | A1 * | 1/2013 | Edwards | G01S 7/062 348/148 |
| 2013/0131978 | A1 * | 5/2013 | Han | G01C 21/3638 701/436 |
| 2013/0222592 | A1 * | 8/2013 | Gieseke | G08G 1/04 348/148 |
| 2014/0142839 | A1 * | 5/2014 | Kaminade | G08G 1/166 701/301 |
| 2014/0172244 | A1 * | 6/2014 | Lee | B60P 3/40 701/49 |
| 2015/0117715 | A1 * | 4/2015 | Murao | G06K 9/00825 382/104 |
| 2015/0120138 | A1 * | 4/2015 | Zeng | B62D 15/0265 701/41 |
| 2015/0120178 | A1 * | 4/2015 | Kleve | G01C 21/34 701/408 |
| 2015/0210312 | A1 * | 7/2015 | Stein | B60W 30/00 701/41 |
| 2015/0260530 | A1 * | 9/2015 | Stenborg | G01C 21/30 701/461 |
| 2015/0269843 | A1 * | 9/2015 | Ichinokawa | G08G 1/167 340/435 |
| 2015/0293216 | A1 * | 10/2015 | O'Dea | B60W 30/12 701/23 |

OTHER PUBLICATIONS

Sugimoto, Effectiveness Estimation Method for Advanced Driver Assistance System and Its Application to Collision Mitigation Brake System, pp. 1-8.

* cited by examiner

VEHICLE OBSTRUCTION DETECTION

FIELD

The following disclosure relates to vehicle obstruction detection, and more specifically to detecting stationary obstructions in the paths of vehicles.

BACKGROUND

Vehicles commonly travel roadways and other thoroughfares as guided by an operator or driver. The vehicles may take any shape or form of transportation device, and occasionally may be an automobile that has a particular height. The roadway designers consider this typical height, and design overpasses, signs, and other obstructions to exist with and over the roadway that have a minimum height that is higher than the typical height of vehicles that travel the roadway. At times, however, vehicles may have a height that is higher than a typical height of vehicles that travel a roadway. For example, the vehicle may be a bus or a freight carrying vehicle that has a height higher than heights of typical vehicles that travel a roadway. Similarly, some vehicles may be equipped with additional equipment and/or devices that cause a vehicle to have a height that is higher than a typical height of vehicles on the roadway. When a vehicle operator of a vehicle having a higher than typical height is not alert or astutely aware of the additional height of the vehicle, the vehicle may be damaged due to a collision with objects in the roadway, such as the overpasses and/or signs.

SUMMARY

In an embodiment, a method involves recording, by a processor of a data acquisition device coupled with a vehicle, measurements while the vehicle is traveling through a geographic area, the measurements including a velocity of the vehicle, and positions relative to the vehicle of several objects in the geographic area. The method also may involve determining, by the processor, a path of a vehicle, and detecting an obstruction in the path, wherein the obstruction is an object of the several objects. The method also may involve establishing, by the processor as a function of the velocity of the vehicle and multiple positions of the obstruction relative to the vehicle, that the obstruction is a stationary obstruction, and providing a notification of the stationary obstruction in the path of the vehicle.

In an embodiment, an apparatus involves at least one processor and at least one memory including computer program code and operable to store data indicative of locations of objects relative to a vehicle and velocity of the vehicle. The at least one memory and the computer program code configured to, with the at least one processor, cause the apparatus to record a plurality of measurements while the vehicle is traveling through a geographic area, the plurality of measurements comprising the velocity of the vehicle and the positions of objects in the geographic area. The at least one memory and the computer program code may also be configured to, with the at least one processor, cause the apparatus to determine a predicted path of the vehicle and detect an obstruction in the path, wherein the obstruction is an object of the plurality of objects. The at least one memory and the computer program code may also be configured to, with the at least one processor, cause the apparatus to establish, as a function of the velocity of the vehicle and multiple position recordings of the obstruction, that the obstruction is a stationary obstruction, and/or provide a notification of the stationary obstruction in the path of the vehicle.

In an embodiment, a non-transitory computer readable medium includes instructions that when executed by a processor are configured to cause the apparatus to record a plurality of measurements while the vehicle is traveling through a geographic area, the plurality of measurements including a velocity of the vehicle, positions relative to the vehicle of a plurality of objects in the geographic area, and a measure of a minimum height of the plurality of objects. The instructions may also be operable to cause the apparatus to determine a path of a vehicle, and detect an obstruction in the path, wherein the obstruction is an object of the plurality of objects and the obstruction has a minimum height lower than a height of the vehicle. The instructions may also be operable to cause the apparatus to establish, as a function of the velocity of the vehicle and multiple positions of the obstruction relative to the vehicle, that the obstruction is a stationary obstruction.

BRIEF DESCRIPTION OF THE DRAWINGS

Example embodiments of the present invention are described herein with reference to the following drawings.

DETAILED DESCRIPTION

Obstructions may be determined for vehicles by recording measurements of objects in the vicinity and/or shared geographic area of a vehicle, determining a path of the vehicle, and determining that an object is a stationary object, or obstruction, in the path of the vehicle. Further, several measurements may be taken over time and may include a minimum height of the objects which may be compared to a maximum height of the vehicle.

Various data acquisition techniques, such as Light Detection and Ranging (LIDAR) or photogrammetry methods, may be used to take measurements of objects in a geographic area. For example, as is described further below with respect to FIGS. 5A-C, a vehicle may be equipped with a geographic measurement device, which may use LIDAR technology. The geographic measurement, or data acquisition, device may be attached or otherwise physically coupled with the top of the vehicle to achieve an optimal height for recording geographic measurements of objects. This additional height increases the minimum height that an obstruction must have so that the vehicle may pass underneath without a collision.

In an embodiment, a vehicle may be equipped with a LIDAR based data acquisition device for recording mapping and/or navigation data along geographic areas of roadways. The data acquisition device may take pictures and record measurements of buildings, structures, and/or other objects along the roadway. The data of the data acquisition device may be developed into a three dimensional (3D) model of the geographic area around roadways that includes representations of the objects around the roadways. The same equipment used to gather such mapping and/or navigation data may also be used to detect vehicle obstructions in real-time as the vehicle is traveling. Further, such detection may be valuable in causing an operator of the vehicle, or the vehicle itself, to take actions to avoid damage to the data acquisition device and/or the vehicle.

Figure 1:
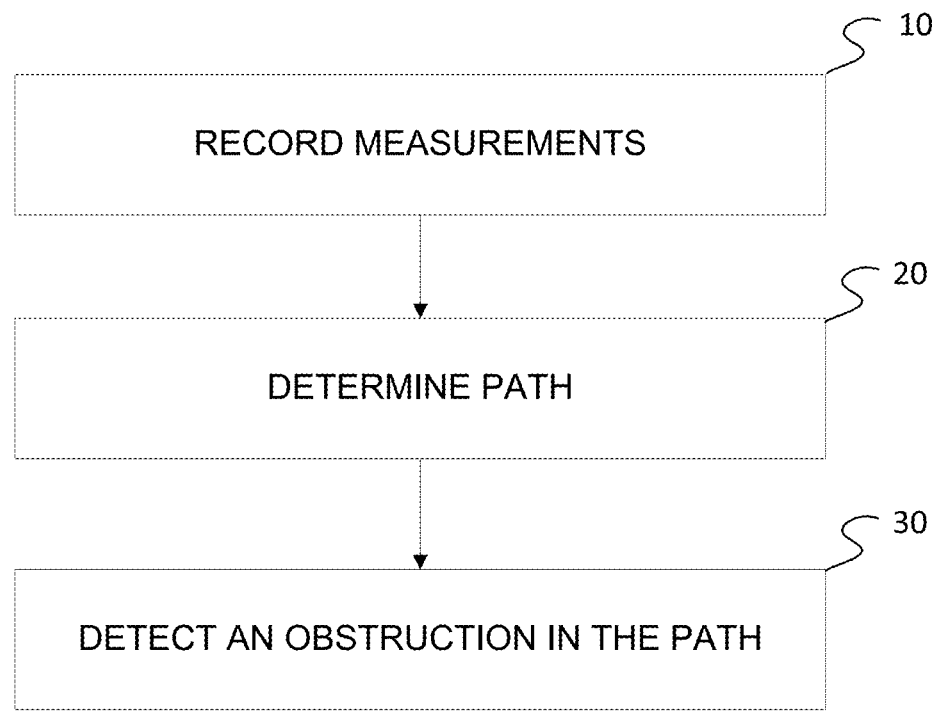
FIG. 1 illustrates a flow chart of an example embodiment for vehicle obstruction detection.

FIG. 1 illustrates a flow chart of an example embodiment for vehicle obstruction detection. As presented in the following sections, the acts may be performed using any combination of the components indicated in FIG. 4, FIG. 5A, or FIG. 6. For example the term controller may refer to either controller 200 or processor 300 and the following acts may be performed by data acquisition device 122, server 125, a vehicle 401, or a combination thereof. Additional, different, or fewer acts may be provided. The acts are performed in the order shown or other orders. The acts may also be repeated.

In act 10, measurements are recorded. The measurements are of objects in a geographic area around a vehicle, such as through a LIDAR based measuring device coupled with the vehicle. The objects may be anything in the geographic area of the vehicle. For example, the objects may be geographic and/or natural features such as hills, buttes, or trees, or other manmade features in a roadway such as bridges, signs, or overpasses. The measurements may also include measurements of movement and/or position of the vehicle.

The measurements include a plurality of measurements taken while the vehicle is traveling through the geographic area. The measurements may include a velocity of a vehicle as well as positions and/or geometric properties of the objects. The positions of the objects may be measured relative to the vehicle. Also, the geometric properties of the objects may include a shape of the object, as well as a minimum height or clearance of the object above ground level. The measurements may be taken and/or recorded using any technique. For example, any technique operable to provide the positions and/or geometries of objects may be used. Also, any technique operable to provide the movement, location, and/or a predicted movement of the vehicle may be used.

In act 20, a path is determined. The path may be a path of a vehicle. The path may be determined using any technique. For example, the path may be determined as a future length of a roadway upon which the vehicle is traveling. The roadway may be indicated in a geographic and/or navigation database and correlated to a position determined for the vehicle. As such, the path of the vehicle may be determined as a path following the geographic coordinates for the indicated roadway.

The path may also be determined using movement measurements of the vehicle. For example, current and/or previous locations of the vehicle are known, as are velocities, heading angles, yaw rates and/or yaw angles of the vehicle. A path of the vehicle may be predicted for the vehicle by combining the yaw rate and/or angle with the current heading and/or velocity so as to predict a curve of future coordinates for the vehicle.

In act 30, an obstruction in the path is determined. The obstruction may be in the predicted path of the vehicle. The obstruction may be an object of a group of objects that has had a location and/or geometry measured or otherwise established. The object may be considered in the path of the vehicle when a predicted path of the vehicle through a geographic area intersects with an established location of the object. Also, a distance from the predicted path may provide for an allowable area of probable intersection with the object. As such, the object and the path may not perfectly intersect, but may come close enough to be considered to intersect with the path of the vehicle.

Also, a minimum height may be measured for the intersecting object. In an embodiment, the minimum height of the object may be compared to a height, or maximum height, of the vehicle. When such a comparison indicates that the intersecting object's minimum height is lower than the vehicle's height, the object may be considered an obstruction. Conversely, when the comparison indicates that the intersecting object's minimum height is higher than the vehicle's height, the object may not be considered an obstruction.

In an embodiment, objects may be established as stationary objects. Objects may be established as stationary objects using multiple measurements of the object positions. For example, if an object's position changes through a series of measurements, the object is not considered stationary, and may be considered a moving object. Further, if an object is determined to be stationary, but the object position changes in subsequent measurements, the object may be considered moveable. In an embodiment, only stationary objects may be considered obstructions in the path of a vehicle.

Figure 2:
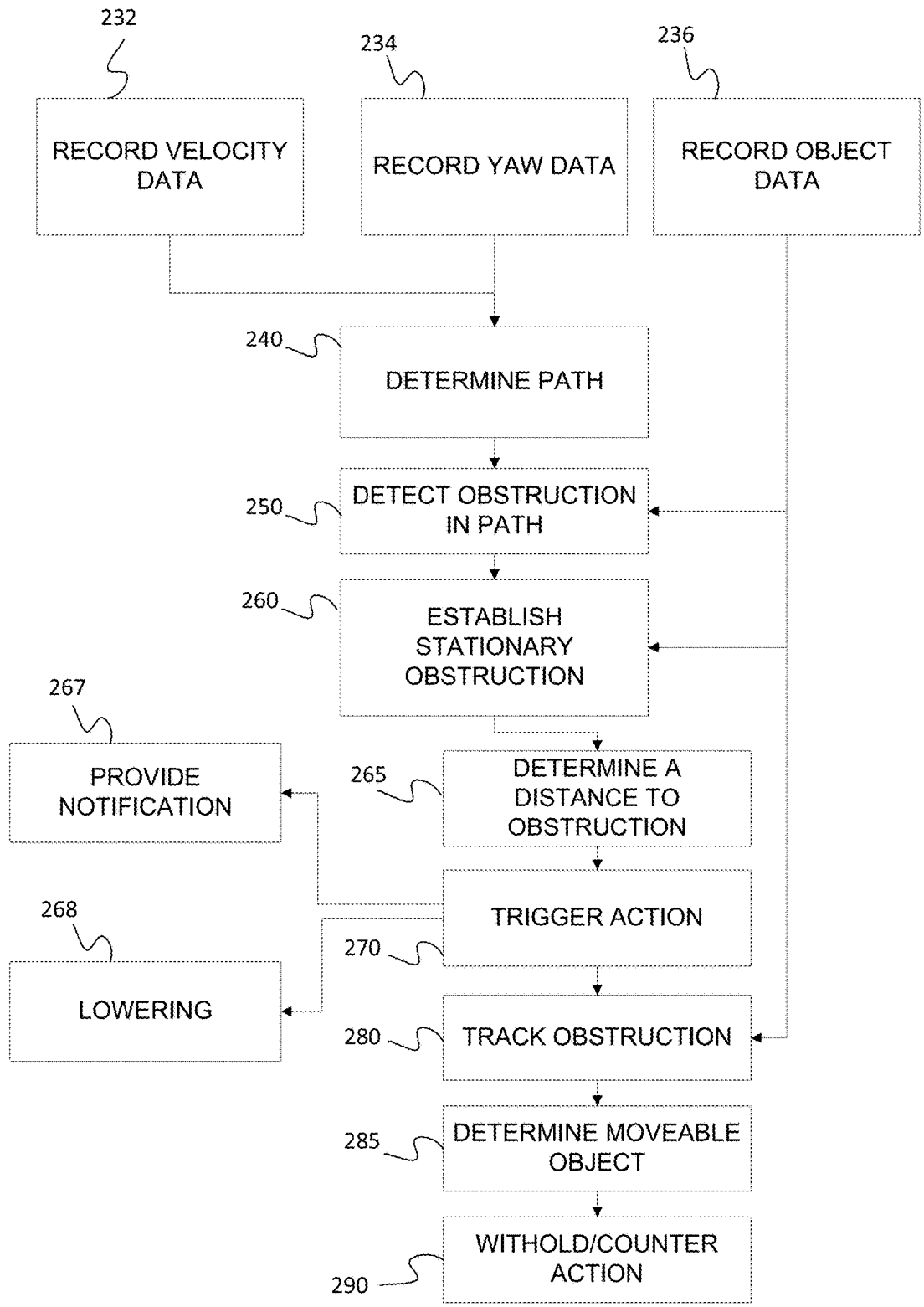
FIG. 2 illustrates flow chart of another example embodiment for vehicle obstruction detection.

FIG. 2 illustrates another flow chart of an example embodiment for vehicle obstruction detection. As presented in the following sections, the acts may be performed using any combination of the components indicated in FIG. 4, FIG. 5A, or FIG. 6. For example the term controller may refer to either controller 200 or processor 300 and the following acts may be performed by data acquisition device 122, server 125, a vehicle 401, or a combination thereof. Additional, different, or fewer acts may be provided. The acts are performed in the order shown or other orders. The acts may also be repeated.

In act 232, velocity data is recorded. The velocity data may be measured and/or recorded using the movement circuitry 208 as described below with respect to FIG. 5A. The velocity may be measured using a data acquisition device coupled with a vehicle. The velocity data is indicative of the velocity of the vehicle at the moment when the velocity is determined, measured, and/or recorded. The velocity data may also include heading data that is indicative of a direction of travel of the vehicle.

In act 234, yaw data is recorded. The yaw data may be measured and/or recorded using the movement circuitry 208 as described below with respect to FIG. 5A. The yaw rate and/or angle may be measured using a data acquisition device coupled with the vehicle, or by sensors of the vehicle. The yaw data is indicative of a yaw rate and/or angle of the vehicle during movement when the data is determined, measured, and/or recorded. The yaw data involves data describing a rotation, or rotational position, around a vertical axis of the vehicle.

In act 236, object data is recorded. The yaw data may be measured and/or recorded using the object measurement circuitry 201 as described below with respect to FIG. 5A. The object data may be measured using a data acquisition device coupled with the vehicle, for example, a device employing LIDAR techniques. The object data is indicative of the position and/or geometry of objects. The object data may include data indicating positions of objects relative to a vehicle, as well as geometries of objects. Data indicating the geometries of objects may include a minimum height of the objects.

The object data may be of a singular object, or of multiple objects. Each of the objects may be identified and/or indexed as potential obstructions from the object data recorded in act 236. For example, contiguous geometric data may be received and/or recorded that indicates a particular object is detected. The particular object may then be identified, such as with an identifying name and/or index number, and the data stored as associated with the identified particular objects. Therefore, data may be recorded and/or tracked for multiple objects.

The recording of velocity data, yaw data, and object data may be repeated over a period of time for multiple measurements. The multiple measurements may be taken while the vehicle is traveling through a geographic area. The measurements may be periodic, random, or taken as needed and/or requested while the vehicle travels through the geographic area.

In an embodiment, a vehicle height may be established. The vehicle height may be only the height of the vehicle. The vehicle height may also include the height of a data acquisition device mounted on the top of the vehicle. The vehicle height may be established using any technique. For example, the vehicle height may be established as a standard fixed number prior to movement and/or traveling of the vehicle. The vehicle height may also be measured. In an embodiment, the vehicle height may be measured as a data acquisition device start-up routine. For example, a data acquisition device may be placed on top of a vehicle. An object measuring device, such as a device using LIDAR technology, may be part of the data acquisition device. The object measuring device may have a geometric measurement instrument or sensor placed at the maximum height of the device so as to have an optimal range of view for measuring objects. Such an object measuring device may also measure a distance from ground level to the maximum height of the instrument/device. This distance may be the vehicle height. Also, this height may be adjustable, though automatic or manual techniques. This height may be re-established and/or measured after any such adjustment.

In act 240, a path is determined. The path is the path of the vehicle. The path may be determined using any technique. In an embodiment, the path may be determined using current and/or previously recorded velocity and/or heading data along with the yaw data. For example, the path may be a predicted path 325, discussed below with respect to FIG. 3.

Figure 3:
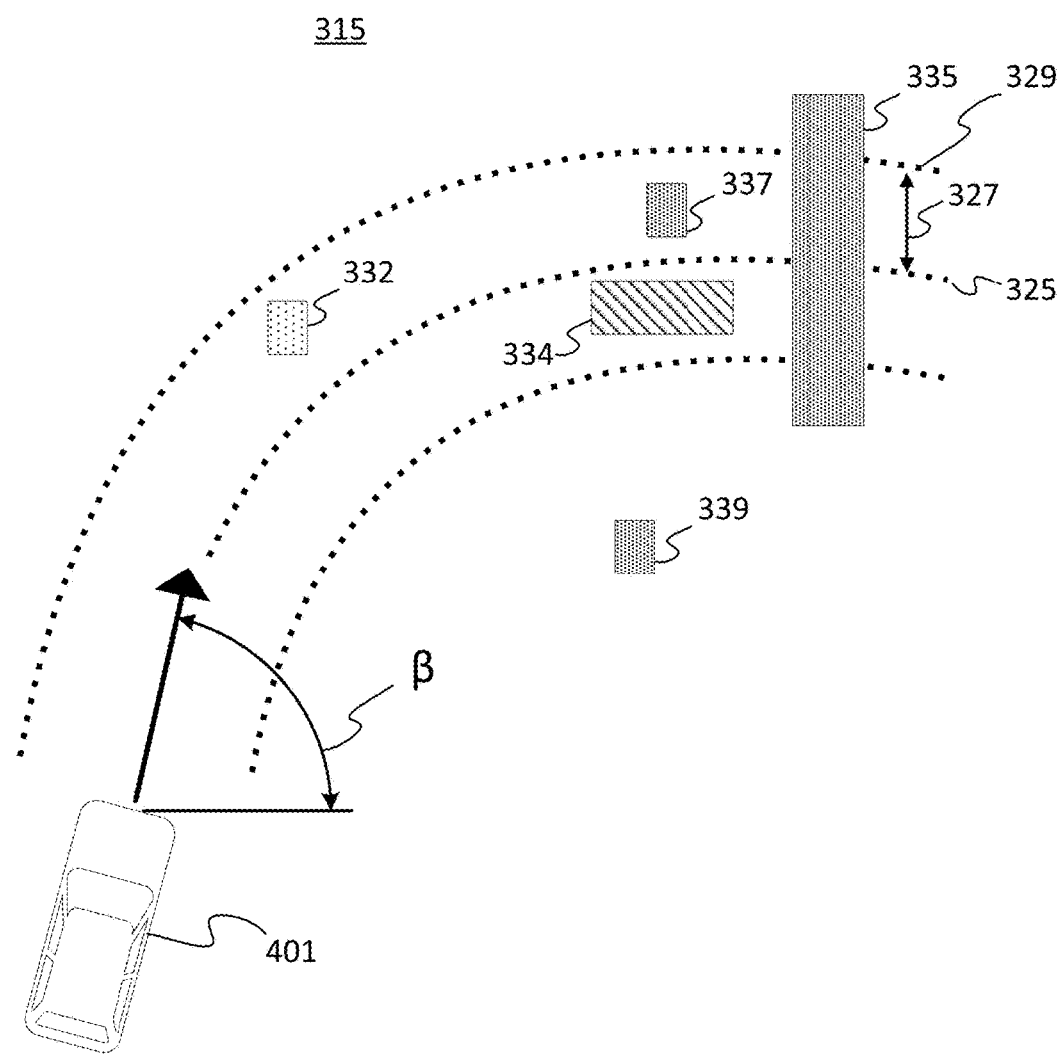
FIG. 3 illustrates a predicted path of a vehicle through a geographic area.

FIG. 3 illustrates a vehicle 401 traveling through a geographic area 315 that includes multiple objects 332, 334, 335, 337, 339. A predicted path 325 of the vehicle may be provided using Equations 1-5 below.

$$\beta(i+1)=\beta(i)+(\omega(i)*\Delta t) \quad \text{Equation 1}$$

Equation 1 provides a predicted yaw angle, $\beta$, at an incremental prediction (i+1), where $\beta(i)$ is the current yaw angle of the vehicle, $\omega(i)$ is the current yaw rate, and $\Delta t$ is the time difference in the incremental step (from i to i+1).

$$V_x(i)=V(i)\cos(\beta(i)) \quad \text{Equation 2}$$

Equation 2 provides a current velocity along an X axis, $V_x(i)$, where $\beta(i)$ is the current yaw angle of the vehicle, $V(i)$ is the magnitude of the current velocity of the vehicle.

$$V_y(i)=V(i)\sin(\beta(i)) \quad \text{Equation 3}$$

Similarly, equation 3 provides a current velocity along a Y axis, $V_y(i)$, where $\beta(i)$ is the current yaw angle of the vehicle, $V(i)$ is the magnitude of the current velocity of the vehicle.

Specific predicted positions over time may then be provided by Equations 4 and 5.

$$X(i+1)=X(i)+V_x(i)*\Delta t \quad \text{Equation 4}$$

Equation 4 provides a predicted position along the X axis, $X(i+1)$, at an incremental prediction (i+1), where $X(i)$ is the current position of the vehicle along the X axis, $V_x(i)$ is the current velocity of the vehicle along the X axis, and $\Delta t$ is the time difference in the incremental step (from i to i+1).

$$Y(i+1)=Y(i)+V_y(i)*\Delta t \quad \text{Equation 5}$$

Equation 5 provides a predicted position along the Y axis, $Y(i+1)$, at an incremental prediction (i+1), where $Y(i)$ is the current position of the vehicle along the Y axis, $V_y(i)$ is the current velocity of the vehicle along the Y axis, and $\Delta t$ is the time difference in the incremental step (from i to i+1).

Equations 1-5 may be used to extrapolate a sequence of predicted positions to an $n^{th}$ increment (i.e. i+n). The sequence can be plotted and/or otherwise tracked through the geographic area to determine a predicted path 325 of the vehicle.

Referring again to FIG. 2, in act 250, an obstruction in a path is detected. The obstruction in the path may be an object of multiple objects, each of which is in a geographic area shared by the vehicle. The obstruction in the path is detected using object position data of the object data recorded in act 236. The position data of a particular object may be compared to the predicted path of the vehicle. If an intersection, or near intersection, of the path with the determined position of the particular object is detected, the object is considered in the path of the vehicle.

In an embodiment as illustrated in FIG. 3, a threshold variance distance 327 from the predicted path 325 may be used to determine whether an object is in the path. For example, if an object 337 is contained within the area bounded by the threshold variance distance 327 from the predicted path 325, the object is in the path. Further, an object 335 may cross the extent of the area bounded by the threshold variance distance 327 from the predicted path 325, and such an object 335 may be considered in the predicted path 325. However, an object 339 may not be within an area bounded by the threshold variance distance 327 from the predicted path 325, and would not be in the path.

In an embodiment, a vehicle height is compared to the object minimum height. Detecting an obstruction in the path may thus involve detecting an object in the path that has an object minimum height lower than the vehicle and/or device height.

In act 260 of FIG. 2, a stationary obstruction may be established. The stationary obstruction may be established as a function of, or otherwise based on, the velocity of the vehicle and position data of an object. For example, a stationary object may be determined through multiple recordings of a position of the object. If the position of the object stays the same, or stays the same within an acceptable variation, the object may be considered to be a stationary object. An acceptable variation may be determined using a position variation, or object velocity, threshold. A position variation, or velocity, threshold may be used with an object velocity magnitude determined in a frame which is fixed to the ground or other fixed geographic reference. If the velocity magnitude is lower than the threshold, the object may be considered stationary. In another example, a variation of the position value may be compared to the position variation threshold, and if the variation value is equal to, or less, than the threshold, the object may be considered stationary.

The measurement of the positions of objects may be made relative to the vehicle. As such, the vehicle movement may be taken into consideration for establishing a stationary obstruction. In an embodiment, the obstruction is determined as a stationary obstruction as a function of the velocity of the vehicle and multiple positions of the obstruction relative to the vehicle. This can be explained further with reference to FIG. 3. Velocities of objects 332, 334, 335, 337, 339 relative to the vehicle may be determined using Equations 6 and 7.

$$V_{obj-x}(i) = \frac{X_{obj}(i) - X_{obj}(i-1)}{(\Delta t)} \quad \text{Equation 6}$$

Equation 6 provides a current velocity of an object along the X axis, $V_{obj-x}(i)$, where $X_{obj}(i)$ is the current position of the object along the X axis, for example the current position of the object with respect to the vehicle, $X_{obj}(i-1)$ is the position of the object along the X axis that was previously recorded, and $\Delta t$ is the time difference from the (i−1)th measurement to the (i)th measurement.

$$V_{obj-y}(i) = \frac{Y_{obj}(i) - Y_{obj}(i-1)}{(\Delta t)} \quad \text{Equation 7}$$

Equation 7 provides a current velocity of an object along the Y axis, $V_{obj-y}(i)$, where $Y_{obj}(i)$ is the current position of the object along the Y axis, for example the current position of the object with respect to the vehicle, $Y_{obj}(i-1)$ is the position of the object along the Y axis that was previously recorded, and $\Delta t$ is the time difference from the (i−1) measurement to the from (i) measurement.

Ultimately, a position variance value, or object velocity, may be used to determine whether an object is moving or stationary. A position variance value ($V_{obj}(i)$) may be determined using Equation 8.

$$V_{obj}(i) = (V_{obj-x}(i) \mp V_x(i))^2 + (V_{obj-y}(i) \mp V_y(i))^2 \quad \text{Equation 8}$$

A threshold may be compared to determine whether the object is stationary. For example, a threshold $K_V$ may then be established such that if $V_{obj}(i)$ is less than $K_V$ then the object is established as stationary. Also, if $V_{obj}(i)$ is more than $K_V$ then the object is established as moving. Referring to FIG. 3, some objects may be determined to be moving 334, such as is consistent with vehicles along a roadway. Other objects 332 may have been once considered stationary, but have since been detected as moving and as such are considered moveable. Also, an object 339 may be determined as a stationary object, but is determined not to be in the path 325 of the vehicle 401. Other objects 337, 335 may be considered stationary and in the path 325. Objects stationary and in the path 327 of the vehicle 401 are stationary obstructions.

In an embodiment, the position of objects along the X and Y axis may be determined on a global coordinate system, using a position of the vehicle to position the objects in the global coordinate system based on positions of the objects determined relative to the vehicle, for example positions of objects determined using LIDAR techniques. The positions in the global coordinate system may be monitored over time, and if the variation in position is below an established threshold, the object may be considered stationary.

Again referring to FIG. 2, in act 265, a distance to an obstruction may be determined. The distance may be a distance along a path or predicted path of the vehicle. Also, a time to reach the obstruction may be determined using the current and/or previously recorded velocity data for the vehicle and the distance to the obstruction.

In act 270, an action may be triggered. The action may be triggered based on any trigger. The detection of an obstruction in the path, such as is indicated in act 250, may be a trigger. The action may also, or alternatively, be triggered based on the establishment of the stationary obstruction in a path, such as is indicated in act 260. The action may be triggered when the trigger is detected, shortly thereafter, or at any time established after the trigger. In an embodiment, a set amount of time may be required to elapse after the detection of the trigger prior to triggering the action. In another embodiment involving a distance along the path to the obstruction determination, the action may be triggered when the distance is less than a distance threshold value. Also, a time to collision value may be determined based on the distance to the obstruction, and an action may be triggered based on the time to collision value going below a threshold time value.

Also, multiple actions may be triggered, and multiple triggers may be used. In an embodiment, an action is triggered when an obstruction having a minimum height lower than a maximum vehicle height is established as a stationary obstruction and is detected in the path of the vehicle. In an embodiment, moveable and moving objects in the path of the vehicle are not considered obstructions in the path of the vehicle.

The action may be any action. For example, the action may be taken by an autonomous vehicle or an advanced driver assistance system ("ADAS"), and may include a control of the vehicle, such as stopping, slowing, and/or otherwise controlling the movement of the vehicle. In a vehicle equipped with an ADAS, a computing system may generate driving commands for steering the vehicle, shifting gears, increasing and decreasing the throttle, and braking to avoid the determined obstructions in the path of the vehicle. For example, when a navigation system may provide an alternate route that avoids the obstruction in the path. The vehicle may be fully or partially controlled by the ADAS to follow the alternate route.

In an embodiment, act 268 includes lowering a vehicle and/or a part or attachment of the vehicle. For example, the action includes lowering a data acquisition device. The lowering may include lowering the device to a height that is lower than the measured minimum height of the obstruction in the path.

In an embodiment, act 267 includes providing a notification. For example, a notification of the obstruction in the path of the vehicle may be provided as an audible and/or visible warning to an operator of the vehicle. The warning may be provided by the output interface 211 of the data acquisition device 122 as described below with respect to FIG. 5A. The warning may provide text that provides instruction to the operator, such as "Lower Device," or "Take Alternate Route." The text may also include a description of the nature of the warning, such as "Low Overpass Detected." The notification may involve a buzzer, ringing, or otherwise audible alarm to indicate the warning to the operator.

In an embodiment, the action may also involve adding a record in a geographic and/or navigation database, such as the database 123 described below with respect to FIG. 4. The record may involve the location of the established obstruction. The record may also involve data indicating a height of the established obstruction. The record may be associated with a road link existing in the database at a location representing the location of the established obstruction.

In act 280, the obstruction is tracked. The obstruction is the obstruction in the path. The obstruction may be tracked over a period of time for multiple measurements. For example, the obstruction may be identified and/or indexed as a particular obstruction. The particular obstruction may have a position determined multiple times, and as such a stationary object determination may be made at multiple times. Data indicating these obstruction locations and/or stationary object determinations may be associated with the particular object in a relational table and/or array. Reference may be made to the table and/or array to determine changes in a status of the obstruction. For example, a predicted path for the vehicle may change and the obstruction may no longer be in the path. Also, the obstruction may no longer be determined to be a stationary obstruction through reference of the data in the table and/or array, as is indicated in act 285.

In act 285, a moveable object may be determined. The moveable object may be an object that was established as stationary, but was determined in subsequent measurements to move. Also, the moveable object may have been established as a moving object, but subsequent measurements have indicated that the object is no longer moving. For example, a table and/or array containing data relating to the positions and/or stationary determinations for the object may be referenced. The data may indicate that a previously determined stationary object now has data indicating that the object has moved. Such an object may be considered a moveable object. Similarly, a previously determined stationary, or non-moving, object may now be determined to be stationary, and may be considered a moveable object.

In act 290, action may be withheld, or provided with a counter action. This may be in response to detecting that an established stationary obstruction is now considered a moveable object, as is indicated by act 285. Upon detecting a moveable object, an action may be withheld, or a counter action may be taken. For example, a notification provided for a previously established stationary obstruction that was determined to be a moveable object, may be withheld or otherwise removed. Further, previous actions, such as lowering the vehicle or a device associated with the vehicle, may be countered so as to raise the vehicle and/or associated device. In an embodiment, a record indicating an established stationary obstruction may be removed from a geographic and/or navigation database, such as database 123 described below with respect to FIG. 4, when a previously determined stationary obstruction is determined to be a moveable object.

Figure 4:
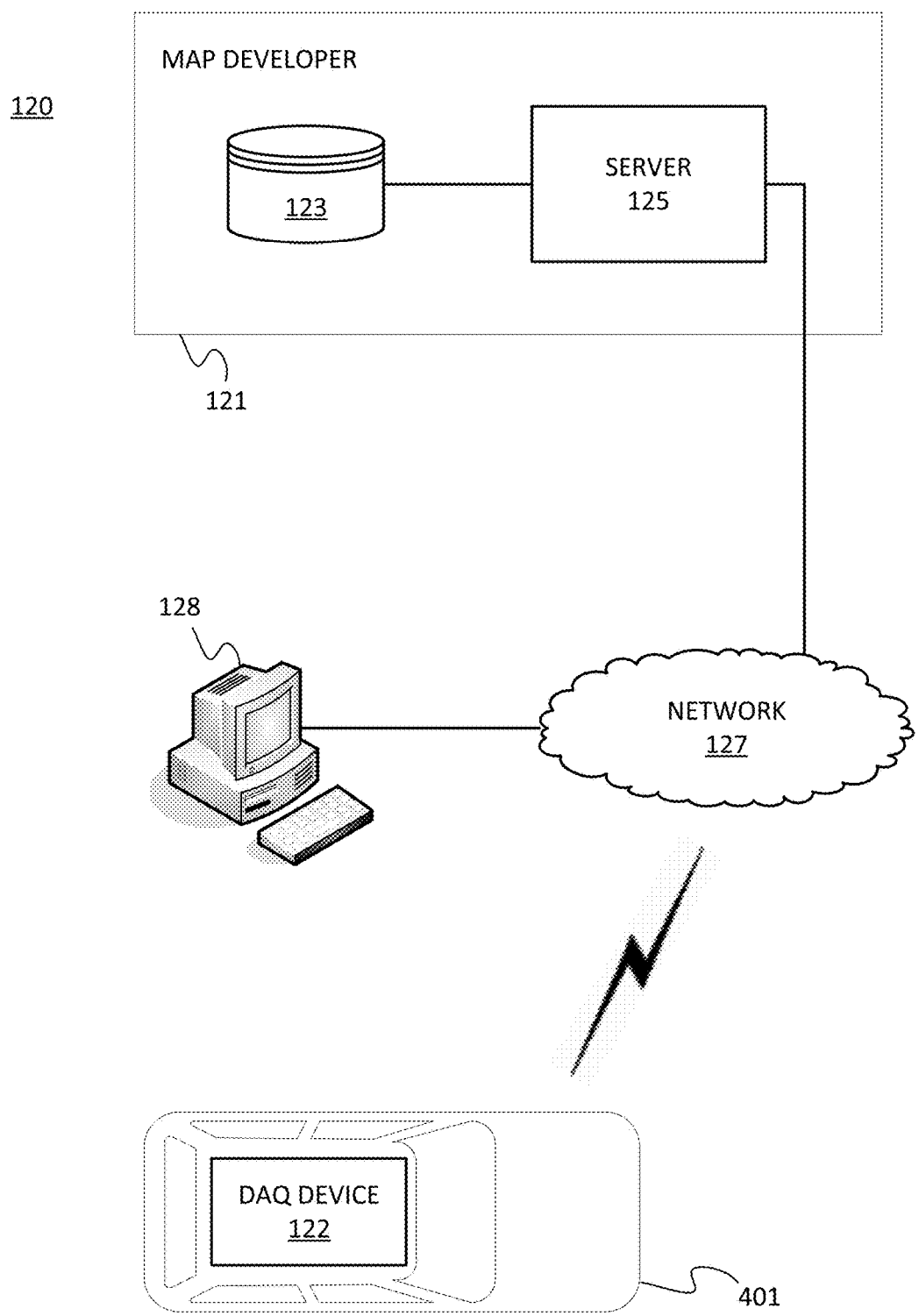
FIG. 4 illustrates an example system for vehicle obstruction detection.

FIG. 4 illustrates an exemplary system 120 for obstruction detection. The system 120 may include a developer system 121, an optional workstation 128, a data acquisition (DAQ) device 122, and a network 127. The DAQ device 122 may be associated, coupled, or otherwise integrated with a vehicle 401. Additional, different, or fewer components may be provided. For example, many DAQ devices 122 and/or the workstations 128 may connect with the network 127.

The developer system 121 includes a server 125 and a database 123. The developer system 121 may include computer systems and networks of a system operator such as HERE or NOKIA Corporation. The optional workstation 128 is a general purpose computer including programming specialized for the following embodiments. The workstation 128 includes at least a memory, a processor, and a communication interface. The geographic database 123 may be partially or completely stored in the DAQ device 122 or with other systems of the vehicle 401.

The developer system 121 and the DAQ device 122 are coupled with the network 127. The phrase "coupled with" is defined to mean directly connected to or indirectly connected through one or more intermediate components. Such intermediate components may include hardware and/or software-based components.

The database 123 includes geographic data used for traffic, navigation, and/or assisted or automated driving related applications. The geographic data may include data representing a road network or system including road segment data and node data. The road segment data represent roads or road branches, and the node data represent the ends or intersections of the roads. The road segment data and the node data indicate the location of the roads and intersections as well as various attributes and geometries of the roads and intersections, which may include the locations of stationary obstructions in a roadway. Other formats than road segments and nodes may be used for the geographic data. The geographic data may include geometries of roads, road segments, or road branches determined from sparse data as indicated above.

The DAQ device 122 may include one or more detectors or sensors as a positioning system built or embedded into or within the interior of the DAQ device 122. Alternatively, the DAQ device 122 uses communications signals for position determination. The DAQ device 122 receives location data from the positioning system. The server 125 may receive sensor data configured to describe a position of a DAQ device, or a controller of the DAQ device 122 may receive the sensor data from the positioning system of the DAQ device 122. The DAQ device 122 may also include a system for tracking DAQ device 122 and/or vehicle 401 movement, such as rotation including yaw rates and/or angles, velocity, and/or acceleration. Movement information may also be determined using the positioning system. The DAQ device 122 may use the detectors and sensors to provide data indicating a location of a vehicle.

The DAQ device 122 may communicate location, movement, and object information via the network 127 to the server 125. The server 125 may use the location and movement information received from the DAQ device 122 to associate the DAQ device 122 with a geographic region, or a road of a geographic region, described in the geographic database 123. Server 125 may also associate the DAQ device 122 with a geographic region, or a road of a geographic region, manually.

The server 125 may receive location and movement information from multiple DAQ devices 122 over the network 127. The location, movement, and object information may be in the form of DAQ device data or data points. The server 124 may compare the DAQ device data with data of a road system stored in the database 123. In this way, the positions of vehicles associated with the DAQ devices 122 may be determined relative to a road network or a geographic area. Also, the DAQ device data may be assigned to, or associated with, particular road branches as is described above.

The computing resources for road geometry generation may be divided between the server 125 and the DAQ device 122. In some embodiments, the server 125 performs a majority of the processing. In other embodiments, the DAQ device 122 performs a majority of the processing. In addition, the processing is divided substantially evenly between the server 125 and the DAQ device 122. For example, data may be collected by the DAQ device 122 and obstructions may be detected by the server 125.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5A:
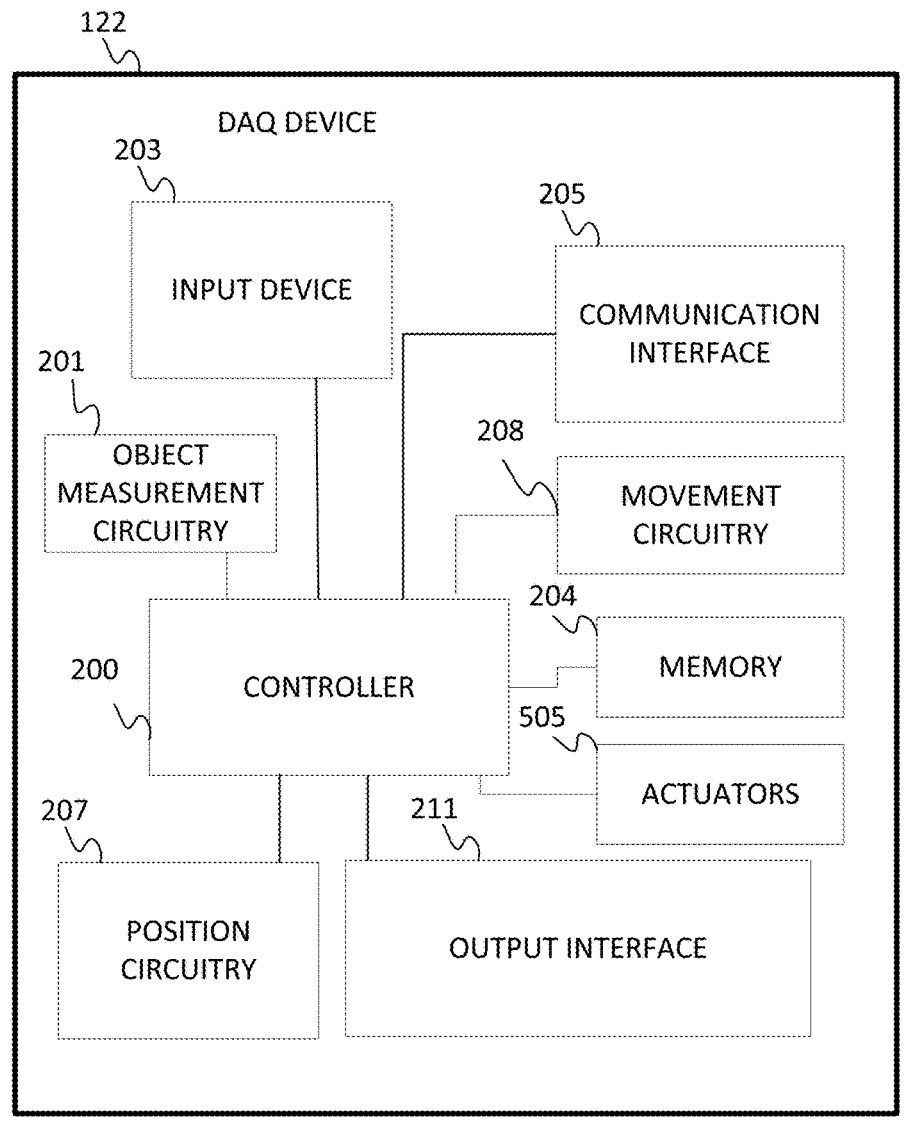
FIG. 5A-C illustrate example data acquisition devices of the system of FIG. 4.
Figure 5B:
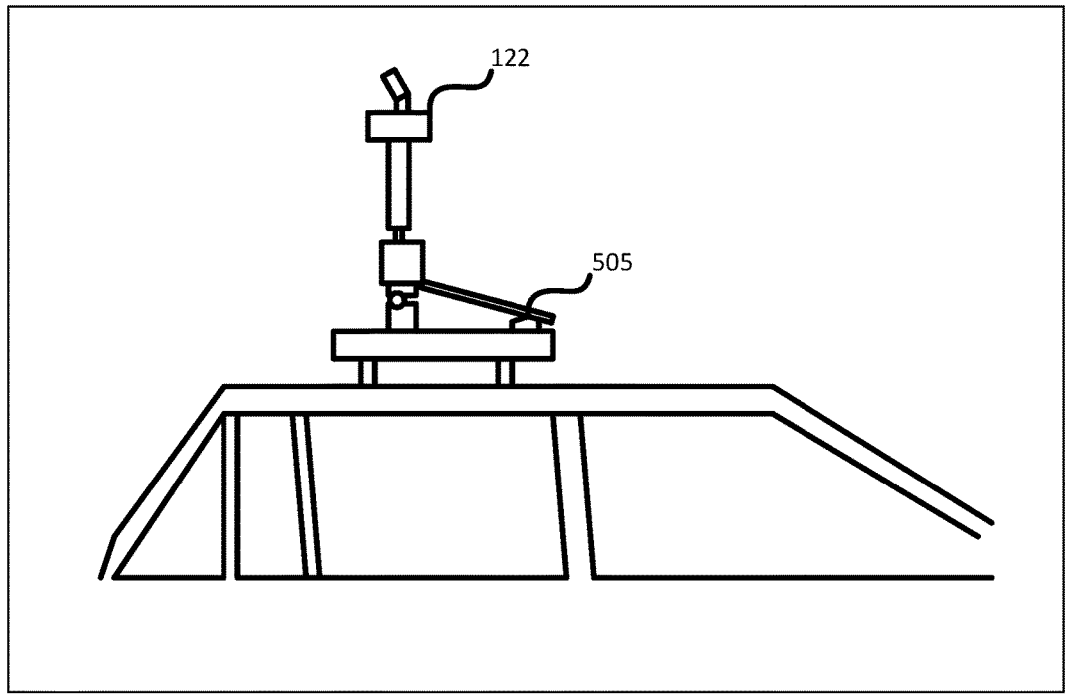
Figure 5C:
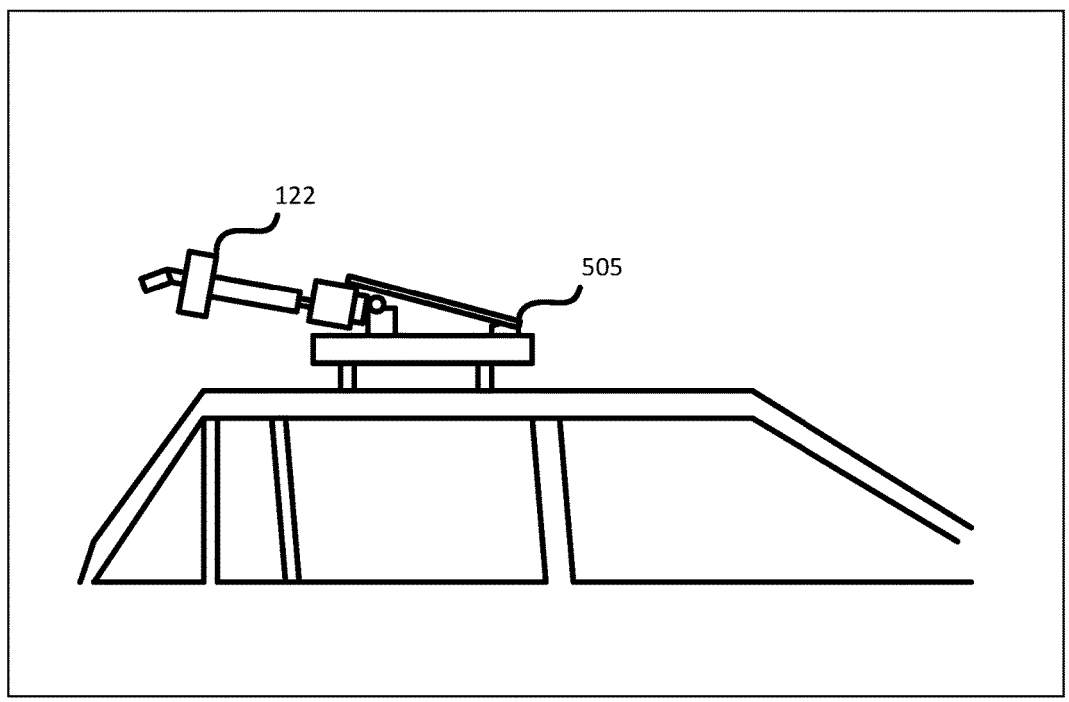

FIG. 5A illustrates an exemplary DAQ device 122 of the system of FIG. 4. The DAQ device 122 includes a controller 200, a memory 204, an input device 203, a communication interface 205, position circuitry 207, movement circuitry 208, object measurement circuitry 201, one or more actuators 505, and an output interface 211. The output interface 211 may present visual or non-visual information such as audio information. Additional, different, or fewer components are possible for the DAQ device 122. The DAQ device 122 is a tablet computer, a smart phone, a mobile phone, a personal digital assistant (PDA), a notebook computer, a personal navigation device (PND), a portable navigation device, an assisted driving device, an automated driving or control device, and/or any other known or later developed DAQ device. The positioning circuitry 207, which is an example of a positioning system, is configured to determine a geographic position of the DAQ device 122 and/or an associated vehicle 401. The movement circuitry 208, which is an example a movement tracking system, is configured to determine movement of a DAQ device 122 but may operate in place of, or in correlation with, other movement sensors and/or circuitry integrated with a vehicle associated with the DAQ device 122. The position circuitry 207 and the movement circuitry 208 may be separate systems, segments of the same positioning or movement circuitry system, or integrated systems of a vehicle associated or otherwise integrated with the DAQ device. In an embodiment, components as described herein with respect to the DAQ device 122 may be implemented as a vehicle, or coupled with a vehicle.

In an embodiment, the memory 204 may be operable to store a plurality of data points associated with a vehicle and objects around the vehicle. The plurality of data points may be generated by a DAQ device at particular times while traveling a road or path through a geographic area.

The positioning circuitry 207 may include suitable sensing devices that measure the traveling distance, speed, direction, and so on, of the DAQ device 122. The positioning system may also include a receiver and correlation chip to obtain a GPS signal. Alternatively or additionally, the one or more detectors or sensors may include an accelerometer and/or a magnetic sensor built or embedded into or within the interior of the DAQ device 122. The accelerometer is operable to detect, recognize, or measure the rate of change of translational and/or rotational movement of the DAQ device 122. The magnetic sensor, or a compass, is configured to generate data indicative of a heading of the DAQ device 122. Data from the accelerometer and the magnetic sensor may indicate orientation of the DAQ device 122. The DAQ device 122 receives location data from the positioning system. The location data indicates the location of the DAQ device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the DAQ device 122. The positioning system may also include a receiver and correlation chip to obtain a GPS signal. The DAQ device 122 receives location data from the positioning system. The location data indicates the location of the DAQ device 122 or a vehicle associated with the DAQ device 122.

The movement circuitry 208 may include gyroscopes, accelerometers, magnetometers, or any other device for tracking or determining movement of a DAQ device. The gyroscope is operable to detect, recognize, or measure the current orientation, or changes in orientation, of a DAQ device. Gyroscope orientation change detection may operate as a measure of yaw, pitch, or roll of the DAQ device. The movement circuitry 208 may be used alone, or with the positioning circuitry 207 to determine DAQ device 122 movement. The movement circuitry may include a yaw rate sensor such as a gyroscopic device that measures the device's angular velocity around a vertical axis. The yaw rate sensor may measure a yaw rate using any technique. For example piezoelectric type and/or micromechanical type yaw rate sensors may be used.

Positioning and movement data obtained from a DAQ device may be considered geographic data, device data, object data, other data, and/or DAQ device data, and may be used to determine obstructions in the path of a vehicle.

The input device 203 may be one or more buttons, keypad, keyboard, mouse, stylus pen, trackball, rocker switch, touch pad, voice recognition circuit, or other device or component for inputting data to the DAQ device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The communication interface 205 is configured to send data such as DAQ device movement, heading, and position data to a server 125. The position circuitry 207 is configured to determine the current location of the DAQ device.

The actuators 505 may include one or more devices configured to enact movement of the DAQ device 122. For example, the actuators 505 may include mechanical components, pneumatic components, electrical components, hydraulic components, or combinations thereof. In an embodiment, such as that shown in FIGS. 5B and 5C, the actuators 505 are configured to raise and/or lower the DAQ device 122. For example, a portion of the device, such as a part of the object measurement circuitry 201, may be configured to be at the maximum height of the DAQ device 122. The actuators 505 may be configured to lower the components so that they are at a lower height. Conversely, the actuators 505 may be configured to return the components to the original height. For example, the actuators 505 may include a linear actuator configured to raise and lower the DAQ device 122. Also, the actuators 505 may be configured to allow for a positioning of the components at any height between the maximum height and the lowest available height configuration of the DAQ device 122.

The object measurement circuitry 201 includes sensors and/or other devices configured to take measurements of objects in vicinity of the DAQ 122 device. The measurements may include position and/or geometrical properties of the objects. The measurements may be provided as object data. In an embodiment, the object data may be measured using LIDAR techniques. LIDAR, also known as LiDAR, Lidar, or other similar representations, is a remote sensing technology that measures distance by illuminating a target with a laser and analyzing the reflected light. Typically LIDAR uses ultraviolet, visible, or near infrared light to image objects and can be used with a wide range of targets. In an embodiment, a LIDAR data acquisition system may be attached or otherwise integrated with the DAQ device 122. There may also be a positioning system integrated with the LIDAR system such as a Global Positioning System (GPS) to provide a base reference in a global coordinate system for the data acquired by the LIDAR system. The positioning system may be the position circuitry 207.

The object measurement circuitry 201 may also include cameras or other image capture devices configured to capture images of a geographic area, and objects therein, surrounding the DAQ device 122. The cameras may be spaced so as to record a full 360 degrees of visibility around the DAQ device 122, or any reduced degree of visibility. In an embodiment, four 24 mega-pixel digital single-lens reflex (DSLR) cameras are configured to capture images of the surrounding area of the DAQ device 122.

In an embodiment, the DAQ device 122 is coupled with a vehicle. The DAQ device includes an object sensor configured to determine locations of objects relative to the vehicle, such as the object measurement circuitry 201. The DAQ device 122 also includes a velocity sensor configured to determine velocity of the vehicle, such as the movement circuitry 208. The DAQ device also includes a processor and/or controller 207 that is coupled with the object sensor and the velocity sensor. The controller 207 is configured to record a plurality of measurements while the vehicle is traveling through a geographic area, the plurality of measurements comprising a velocity of the vehicle as determined from data provided by the velocity sensor, and positions of objects in the geographic area, determine a predicted path of the vehicle, detect an obstruction in the path, wherein the obstruction is an object of the plurality of objects, establish, as a function of the velocity of the vehicle and multiple position recordings of the obstruction, that the obstruction is a stationary obstruction, and provide a notification of the stationary obstruction in the path of the vehicle.

Figure 6:
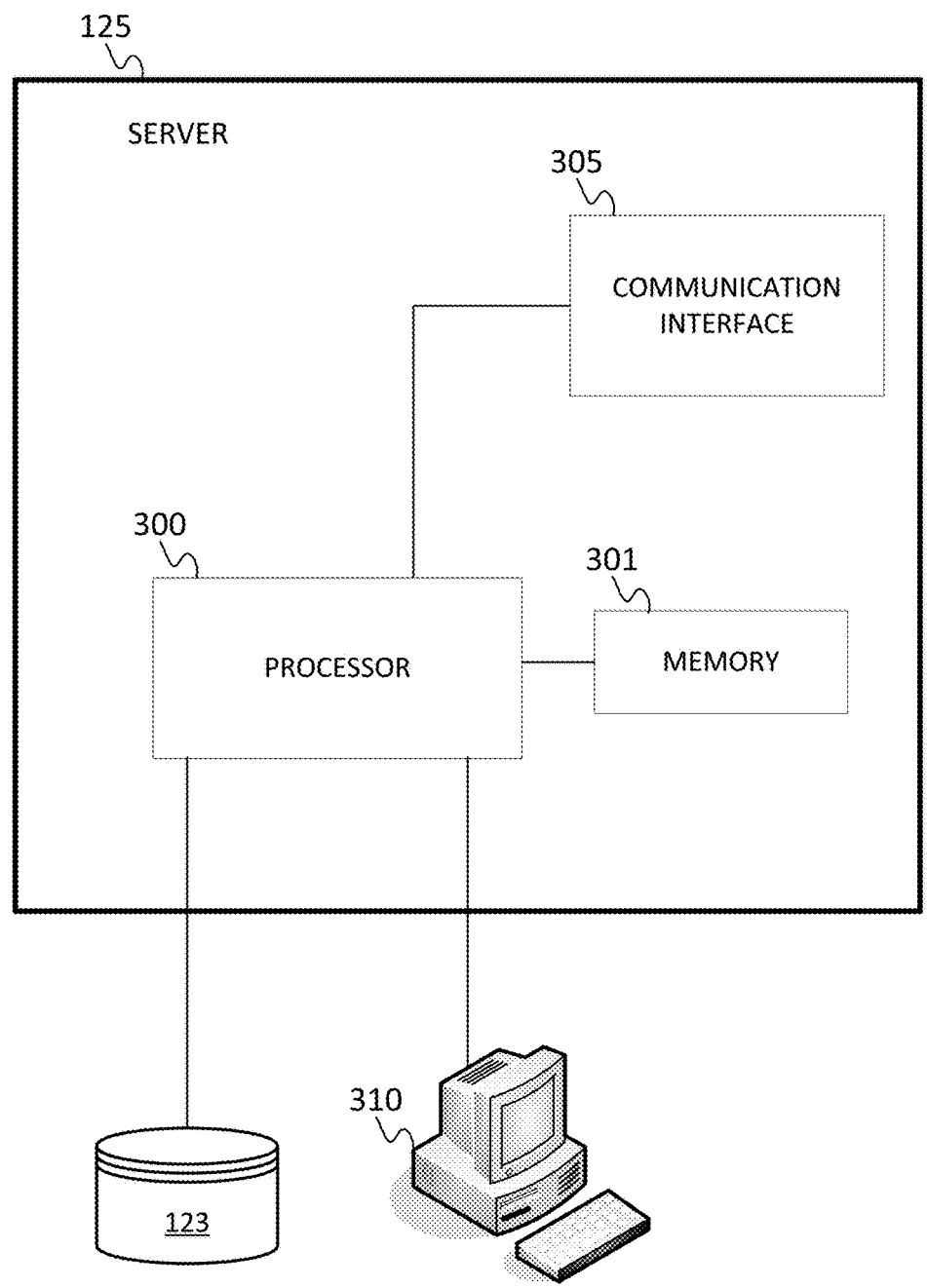
FIG. 6 illustrates an example server of the system of FIG. 4.

FIG. 6 illustrates an exemplary server of the geographic or navigation system of FIG. 4. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 may receive data indicative of inputs made via the DAQ device 122.

In an embodiment, the memory 301 may be operable to store a plurality of data points associated with DAQ devices and/or vehicles. The plurality of data points may be generated by DAQ devices at particular times while traveling a road or path through a geographic area.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the DAQ device 100, such as a secure digital (SD) memory card.

In an embodiment, the memory 204, 301 may be operable to store a plurality of DAQ device data points comprising data indicating positions of vehicles traveling on a roadway of a geographic area. The memory 204, 301 may also be operable to store object data relating to objects of the geographic area.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   recording, by a processor of a data acquisition device coupled with a vehicle, a plurality of measurements while the vehicle is traveling through a geographic area, the plurality of measurements including a velocity of the vehicle, and positions relative to the vehicle of a plurality of objects in the geographic area;
   determining, by the processor, a path of the vehicle;
   detecting, by the processor, an obstruction in the path, wherein the obstruction is an object of the plurality of objects;
   identifying, by the processor, a minimum clearance height for the obstruction;
   establishing, by the processor as a function of the velocity of the vehicle and positions of the obstruction relative to the vehicle, that the obstruction is a stationary obstruction;
   identifying, by the processor, a first data acquisition device height and a second data acquisition device height for the data acquisition device;
   lowering, automatically, the data acquisition device from the first data acquisition device height to the second data acquisition device height when the minimum clearance height is lower than the first data acquisition device height and higher than the second acquisition device height and
   generating, by the processor, an alternative route for the vehicle when the minimum clearance height is lower than the second acquisition device height.

2. The method of claim 1, further comprising:
   providing, by the processor, a notification of the stationary obstruction in the path of the vehicle, wherein the notification comprises a visible warning on a display of the vehicle.

3. The method of claim 1, wherein the plurality of measurements further comprises a yaw rate of the vehicle, and the determining the path of the vehicle comprises determining the path as a function of the velocity of the vehicle and the yaw rate of the vehicle.

4. The method of claim 1, wherein the establishing that the obstruction is a stationary obstruction comprises establishing that the obstruction is a stationary obstruction through a comparison of a result of the function of the velocity of the vehicle and the positions of the obstruction relative to the vehicle to a threshold value.

5. The method of claim 2, further comprising:
   determining a distance along the path to the stationary obstruction in the path of the vehicle, wherein providing the notification comprises providing the notification when the distance is less than a distance threshold value.

6. The method of claim 2, further comprising:
   tracking, by the processor, the stationary obstruction in the path over a period of time;
   determining, by the processor, that the stationary obstruction in the path is a moveable object; and
   withholding the notification when the moveable object is determined.

7. An apparatus comprising:
   a data acquisition device;
   at least one processor;

at least one memory including computer program code and operable to store data indicative of locations of objects relative to a vehicle and velocity of the vehicle; and a lowering actuator configured to automatically lower the apparatus;

the at least one memory and the computer program code configured to, with the at least one processor, cause the apparatus at least to:
- record by the data acquisition device, a plurality of measurements while the vehicle is traveling through a geographic area, the plurality of measurements comprising velocity data of the vehicle and the positions of a plurality of objects in the geographic area,
- determine a current apparatus height,
- determine a path of the vehicle,
- detect an obstruction in the path, wherein the obstruction is an object of the plurality of objects,
- determine an obstruction clearance height,
- establish, as a function of the velocity data and multiple position recordings of the obstruction, that the obstruction is a stationary obstruction,
- determine that the current apparatus height is higher than the obstruction clearance height; and
- trigger the lowering actuator to lower the apparatus including the data acquisition device to below the obstruction clearance height.

8. The apparatus of claim 7, wherein the processor is further configured to establish the current apparatus height using data acquired with at least one sensor of the apparatus.

9. The apparatus of claim 7, further comprising:
an output interface configured to present a notification to an operator of the vehicle in response to determining that the current apparatus height is higher than the obstruction clearance.

10. The apparatus of claim 7, wherein the processor is further configured to establish that the obstruction is a stationary obstruction through a comparison of a result of the function of the velocity of the vehicle and the positions of the obstruction relative to the vehicle to a threshold value.

11. The apparatus of claim 9, wherein the processor is further configured to:
determine a distance along the path to the stationary obstruction in the path of the vehicle, wherein the notification is provided when the distance is less than a distance threshold value.

12. The apparatus of claim 9, wherein the processor is further configured to:
track the stationary obstruction in the path over a period of time;
determine that the stationary obstruction in the path is a moveable object; and
withhold the notification when the moveable object is determined.

13. A non-transitory computer readable medium including instructions that when executed by a processor are configured to cause an apparatus at least to:
- record, with a data acquisition device, a plurality of measurements while a vehicle is traveling through a geographic area, the plurality of measurements including a velocity of the vehicle, positions relative to the vehicle of a plurality of objects in the geographic area, and a measure of a minimum clearance height of the plurality of objects;
- determine a path of the vehicle;
- detect an obstruction in the path, wherein the obstruction is an object of the plurality of objects, and the obstruction has a minimum clearance height lower than a height of the vehicle;
- establish, as a function of the velocity of the vehicle and multiple positions of the obstruction relative to the vehicle, that the obstruction is a stationary obstruction; and
- lower, automatically, part of the vehicle including the data acquisition device to a height that is lower than the minimum clearance height.

14. The medium of claim 13, wherein the obstruction in the path is a highway overpass, a sign, or a bridge in the path of the vehicle.

15. The method of claim 2, wherein the data acquisition device may be partially lowered and the lowered data acquisition device coupled with the vehicle comprises a third data acquisition device height and providing the notification further comprises providing the notification if the minimum clearance height is lower than the third data acquisition device height.

16. The method of claim 1, further comprising:
providing a notification of the stationary obstruction in the path of the vehicle, wherein the notification comprises an audio warning.

17. The medium of claim 13, the instructions further configured to cause the apparatus to provide a notification of the obstruction.

18. The apparatus of claim 7, wherein the processor is further configured to generate an alternative route for the vehicle when the apparatus including the data acquisition device cannot be lowered to below the obstruction clearance height.

19. The medium of claim 13 further including instructions that when executed by the processor are configured to cause the apparatus at least to generate an alternative route for the vehicle when the part of the vehicle including the data acquisition device cannot be lowered to below the minimum clearance height.

* * * * *